(12) United States Patent
Kopra

(10) Patent No.: US 9,826,280 B2
(45) Date of Patent: *Nov. 21, 2017

(54) NAVIGATION AWARE NEWS SERVICE

(71) Applicant: Conversant Wireless Licensing S.a.r.l., Luxembourg (LU)

(72) Inventor: Toni Kopra, Espoo (FI)

(73) Assignee: Conversant Wireless Licensing S.ar.l., Luxembourg (LU)

( * ) Notice: Subject to any disclaimer, the term of this patent is extended or adjusted under 35 U.S.C. 154(b) by 544 days.

This patent is subject to a terminal disclaimer.

(21) Appl. No.: 13/965,180

(22) Filed: Aug. 12, 2013

(65) Prior Publication Data

US 2014/0040933 A1   Feb. 6, 2014

Related U.S. Application Data

(63) Continuation of application No. 09/580,582, filed on May 30, 2000, now Pat. No. 8,540,574.

(51) Int. Cl.
*G07F 17/32* (2006.01)
*H04N 21/488* (2011.01)
*G06Q 50/34* (2012.01)
*H04N 21/442* (2011.01)

(52) U.S. Cl.
CPC ........... *H04N 21/488* (2013.01); *G06Q 50/34* (2013.01); *G07F 17/32* (2013.01); *G07F 17/3223* (2013.01); *G07F 17/3288* (2013.01); *H04N 21/44222* (2013.01)

(58) Field of Classification Search
CPC ........... H04N 21/488; H04N 21/44222; G06Q 50/34; A63F 17/3223; A63F 17/3288
See application file for complete search history.

(56) References Cited

U.S. PATENT DOCUMENTS

| | | | |
|---|---|---|---|
| 4,825,045 | A | 4/1989 | Humble |
| 4,908,761 | A | 3/1990 | Tai |
| 4,910,672 | A | 3/1990 | Mindrum et al. |
| 4,996,642 | A | 2/1991 | Hey |
| 5,053,957 | A | 10/1991 | Suzuki |

(Continued)

FOREIGN PATENT DOCUMENTS

| | | |
|---|---|---|
| EP | 0873772 B1 | 4/1998 |
| EP | 0873772 B1 | 10/1998 |

(Continued)

OTHER PUBLICATIONS

European Office Action for corresponding European Application No. 01 936 699.6-1238, dated Dec. 4, 2009, Europe.

(Continued)

*Primary Examiner* — Corbett B Coburn
(74) *Attorney, Agent, or Firm* — Conversant Wireless Licensing

(57) ABSTRACT

A mobile terminal simultaneously receives an interactive service, such as a betting service, and a web-based news service operating in conjunction with the interactive service across a wireless connection. Both services are simultaneously displayed in different windows on the same display of the mobile terminal. The user's selections, navigation of pages and other input in the interactive service are monitored and used to select related news items for a scrolling news frame.

10 Claims, 13 Drawing Sheets

(56) References Cited

U.S. PATENT DOCUMENTS

| | | | |
|---|---|---|---|
| 5,056,019 A | 10/1991 | Schultz et al. | |
| 5,173,851 A | 12/1992 | Mindrum et al. | |
| 5,201,010 A | 4/1993 | Deaton et al. | |
| 5,327,508 A | 7/1994 | Deaton et al. | |
| 5,353,218 A | 10/1994 | De Lapa et al. | |
| 5,353,219 A | 10/1994 | Mueller et al. | |
| 5,481,094 A | 1/1996 | Suda | |
| 5,502,636 A | 3/1996 | Clarke | |
| 5,504,675 A | 4/1996 | Cragun et al. | |
| 5,539,822 A | 7/1996 | Lett | |
| 5,573,244 A | 11/1996 | Mindes | |
| 5,576,951 A | 11/1996 | Lockwood | |
| 5,583,763 A | 12/1996 | Atcheson et al. | |
| 5,592,560 A | 1/1997 | Deaton et al. | |
| 5,612,868 A | 3/1997 | Mindrum et al. | |
| 5,615,342 A | 3/1997 | Johnson | |
| 5,616,876 A | 4/1997 | Cluts | |
| 5,621,812 A | 4/1997 | Deaton et al. | |
| 5,625,776 A | 4/1997 | Johnson | |
| 5,638,457 A | 6/1997 | Deaton et al. | |
| 5,649,114 A | 7/1997 | Deaton et al. | |
| 5,710,887 A | 1/1998 | Chelliah et al. | |
| 5,715,399 A | 2/1998 | Bezos | |
| 5,717,468 A | 2/1998 | Baryla | |
| 5,740,549 A * | 4/1998 | Reilly | G06Q 30/0243 705/14.42 |
| 5,749,785 A | 5/1998 | Rossides | |
| 5,828,839 A | 10/1998 | Moncreiff | |
| 5,830,068 A | 11/1998 | Brenner et al. | |
| 5,832,457 A | 11/1998 | Cherney et al. | |
| 5,848,396 A | 12/1998 | Gerace | |
| 5,870,030 A | 2/1999 | De Luca et al. | |
| 5,873,782 A | 2/1999 | Hall | |
| 5,915,238 A * | 6/1999 | Tjaden | G10H 1/0033 704/251 |
| 5,948,061 A * | 9/1999 | Merriman | G06Q 30/02 705/14.53 |
| 5,949,326 A | 9/1999 | Sciamarella et al. | |
| 5,970,486 A * | 10/1999 | Yoshida | G06F 17/3064 |
| 5,999,808 A | 12/1999 | LaDue | |
| 6,005,603 A | 12/1999 | Flavin | |
| 6,009,411 A | 12/1999 | Kepecs | |
| 6,011,537 A | 1/2000 | Slotznick | |
| 6,026,370 A | 2/2000 | Jermyn | |
| 6,055,513 A | 4/2000 | Katz et al. | |
| 6,055,573 A | 4/2000 | Gardenswartz et al. | |
| 6,067,524 A | 5/2000 | Byerly et al. | |
| 6,067,568 A * | 5/2000 | Li | H04L 41/00 709/223 |
| 6,076,068 A | 6/2000 | De Lapa et al. | |
| 6,081,780 A * | 6/2000 | Lumelsky | G10L 13/08 704/260 |
| 6,108,645 A * | 8/2000 | Eichstaedt | G06F 17/30867 707/741 |
| 6,112,099 A | 8/2000 | Ketola | |
| 6,112,981 A | 9/2000 | McCall | |
| 6,123,259 A | 9/2000 | Ogasawara | |
| 6,144,968 A * | 11/2000 | Zellweger | G06F 17/30265 |
| 6,165,072 A | 12/2000 | Davis et al. | |
| 6,167,426 A * | 12/2000 | Payne | H04L 29/06 340/7.29 |
| 6,169,989 B1 * | 1/2001 | Eichstaedt | G06F 17/30867 |
| 6,209,025 B1 * | 3/2001 | Bellamy | G06F 3/0219 348/E5.002 |
| 6,227,542 B1 | 5/2001 | Cosmi | |
| 6,282,435 B1 * | 8/2001 | Wagner | H04M 1/72522 345/169 |
| 6,308,329 B1 * | 10/2001 | Takahashi | H04N 7/163 348/552 |
| 6,321,212 B1 | 11/2001 | Lange | |
| 6,341,305 B2 | 1/2002 | Wolfe | |
| 6,343,990 B1 | 2/2002 | Rasmussen et al. | |
| 6,360,195 B1 | 3/2002 | Liao et al. | |
| 6,367,080 B1 | 4/2002 | Enomoto et al. | |
| 6,416,414 B1 | 7/2002 | Stadelmann | |
| 6,430,560 B1 * | 8/2002 | Yoshida | G06F 17/3064 |
| 6,445,932 B1 | 9/2002 | Soini et al. | |
| 6,473,609 B1 | 10/2002 | Schwartz et al. | |
| 6,490,587 B2 * | 12/2002 | Easty | G06F 17/3089 |
| 6,567,846 B1 | 5/2003 | Garg et al. | |
| 6,625,447 B1 | 9/2003 | Rossmann | |
| 6,718,551 B1 * | 4/2004 | Swix | G06Q 30/02 348/E7.075 |
| 6,741,980 B1 * | 5/2004 | Langseth et al. | |
| 6,757,691 B1 * | 6/2004 | Welsh | G06Q 30/02 |
| 6,950,804 B2 * | 9/2005 | Strietzel | G06Q 20/102 705/14.49 |
| 7,117,518 B1 * | 10/2006 | Takahashi | G06F 17/30867 348/E5.105 |
| 7,181,438 B1 * | 2/2007 | Szabo | G06F 17/30522 |
| 7,483,871 B2 * | 1/2009 | Herz | G06F 17/30867 |
| 8,087,050 B2 * | 12/2011 | Ellis | H04H 60/31 725/39 |
| 8,694,480 B2 * | 4/2014 | Henkin | G06F 17/30867 707/705 |
| 9,319,735 B2 * | 4/2016 | Knee | H04N 21/4325 |
| 2001/0041612 A1 | 11/2001 | Garahi et al. | |
| 2003/0037041 A1 * | 2/2003 | Hertz | G06F 17/30867 |

FOREIGN PATENT DOCUMENTS

| | | |
|---|---|---|
| EP | 0899950 B1 | 3/1999 |
| GB | 2330503 A | 8/1998 |
| WO | 9600950 A1 | 1/1996 |
| WO | 9831149 A1 | 4/1998 |
| WO | 9909744 A1 | 2/1999 |
| WO | 0022860 A1 | 4/2000 |
| WO | 0115450 A8 | 3/2001 |

OTHER PUBLICATIONS

Erlandson et al., "WAP—The wireless application Protocol," Ericsson Review No. 4, 1998, pp. 150-153.

* cited by examiner

NAVIGATION AWARE NEWS SERVICE

CROSS-REFERENCE TO RELATED APPLICATIONS

This application claims priority to and is a continuation of U.S. application Ser. No. 09/580,582 filed on May 30, 2000, now issued U.S. Pat. No. 8,540,574. This application also is related to U.S. patent application entitled "Chat System for a Specific Location" U.S. application Ser. No. 09/580,442, not currently published); U.S. patent application entitled "Location Aware Product Placement and Advertising" U.S. application Ser. No. 09/580,583, now issued U.S. Pat. No. 8,175,921); and U.S. patent application entitled "Video Message Sending" U.S. application Ser. No. 09/580,443, not currently published), all of which were filed concurrently with the aforementioned '582 application and all of which are hereby incorporated by reference.

FIELD OF THE INVENTION

This invention relates to communication services. Particular aspects of the invention relate to providing a user interface for a news service operating simultaneously and in conjunction with another real time service.

BACKGROUND OF THE INVENTION

During the last few decades, same-time-same-place gambling has been complemented by same-time-different-place activities. Telephone betting has a long history that includes activities that have been proscribed (e.g., starting price or S.P. bookies), that have been approved (e.g., on-course bookies), and, in some countries, that have been State-conducted (e.g., phone-betting with State Government Totalizator Agency Boards or TABs).

It has long since been recognized that the virtualization of gambling could result in major changes to society. Whereas in 1975 few people might have contemplated a future in which bets could be placed on which member of the British Royal Family would die next, or on which state would next erupt in civil war, such bets can now be placed in the United Kingdom and in several other nations around the world. Betting houses offering such services are becoming readily accessible on the Internet. (See, for example, www.casinos-gambling.com/osbooks.htm.) Additionally, interactive networks are emerging from several hitherto separate technologies, for example, cable transmission, growing out of cable-TV, where the capacity of the connection is typically split between high-bandwidth down-channels and low-bandwidth up-channels. The Internet, with connection to the home and most workplaces via a conventional public switched telephone network (PSTN) can also be used.

Gambling is increasingly becoming a major feature of interactive networks. So much so, it appears to be one of the largest sources of revenue generation on the Internet. Use of the Internet for gambling is especially significant because it is fully operational, it uses an existing and pervasive infrastructure, and its market reach is already very wide. In addition to its physical advantages the growth rate of the Internet is dramatic and it is intrinsically extra-, and even supra-jurisdictional, making it extremely resistant to existing regulatory frameworks.

Satellite and cable infrastructures may be used to operate services independent from the Internet. It is important to note, however, that they are also entirely capable of being used as carrier mechanisms for Internet traffic, and indeed to support both proprietary and Internet channels at the same time. If satellite and/or cable come to supplant the public switched telephone network (PSTN) carried Internet, it will not necessarily supplant the Internet itself.

New third-generation wireless communication networks enable high speed digital services to be delivered to moving receivers. With a Universal Mobile Terrestrial System (UMTS) or Global System for Mobile Communication (GSM) mobile phone connected to a laptop and a DVB-T (terrestrial) receiver plug-in card, browsing the web at speeds of 2-14 Mb/s and diverse content is possible. However, the restricted resources of third-generation mobile terminals require more advanced navigation systems and more intelligent interaction design patterns. (A design pattern is a problem and the core of the solution to that problem.)

Most of the equipment used to create, edit, and distribute programs is now digital. For example, in delivering a news broadcast, the field reporter uses digital satellite news gathering equipment to uplink her report to a programming center. The material is digitally received, decoded, and compiled with live program feeds in a studio. The broadcast is then sent digitally around the world to professional receivers.

It is common in some modern display technologies, such as television receivers, to provide functions such as picture-in-picture (PIP), enhanced audio, and other special features, as options. Current television receivers incorporate such modules on a hard-wired basis. The PIP feature requires a composite video signal from a source other than the television tuner. The signal from that external video source is displayed on a selected portion of the cathode ray tube (CRT) viewing screen along with the main video signal.

An intelligent TV is for receiving communication services by connecting a TV to a value added network (VAN). The intelligent TV includes an information signal processing unit for receiving information communication data (hereinafter, "information data") when the intelligent TV is connected to the VAN, and for generating information RGB signals, and switching control signals in order to display the information data on a screen. The intelligent TV selects and displays on the screen one of the information data signals processed in the information signal processing unit and a TV RGB signal processed in a TV signal processing unit, in accordance with the switching control signal output from the information signal processing unit. Intelligent TV makes it possible to view, through a TV screen, several communication services, such as stock quotes, news services, weather reports, and TV program lists, being transmitted through the VANs. Therefore, it has an advantage that persons who are not familiar with the usage of a computer can easily receive communication services. Even though intelligent TV has the advantage of receiving communication services through the TV screen, it cannot display multiple signals at the same time Information signals for displaying information data on a screen, a TV signal, a Picture-In-Picture (PIP) signal for enabling two screens to be viewed simultaneously, and a TV on-screen-display (OSD) signal must be displayed one at a time. Therefore, signals are displayed according to a predetermined priority. For example, an information signal is displayed preferentially over a TV signal, a PIP signal is displayed preferentially over an information signal, and a TV OSD signal is displayed preferentially over a PIP signal.

Current information delivery services described above lack many features that would enhance their usability and desirability by the public. As mentioned, the intelligent TV lacks an ability to display multiple signals simultaneously. In addition, an online connection of two delivery services with one of the services being, for example, an interactive application, is not available. Current technologies are dependent on stationary receivers. Since multiple signals cannot be integrated by the IRD, information delivery is dependent on the location or site.

With particular regard to betting, real-time betting is quite difficult to carry out when the competition is on going in one location and the betting is done in several different remote places. Current systems do not show the possibility of betting once a competition begins since there is no connection to the betting environment. Existing systems do not offer the possibility of betting during television program reception on the basis of the second screen on the display. Further, bettors are not shown a table for inputting the betting values to be sent to the betting system in real-time. Therefore, current systems are not intuitive or easy to use by a majority of bettors.

Real-time, interactive services can present problems regarding timing and presentation of information. With particular regard to betting services, the user needs to be aware of the betting window available. A slow or non-responsive user interface can cause a bettor to miss the window and loose a betting opportunity. Different bettors may rely on different information or desire the information to be presented in a particular format. The format of the information may detract from the betting experience or impair the calculating abilities of some bettors. However, current systems provide a standardized format without being aware of, and responsive to, the respective preferences of different bettors.

SUMMARY OF THE INVENTION

The disclosed embodiments provide methods and systems utilizing a graphical user interface (GUI) for simultaneously providing an interactive service, such as a betting service, and a web-based news service operating in conjunction with the interactive service across a wireless connection. Both services are preferably simultaneously displayed in different windows on the same display of third generation mobile terminals. The methods and systems according to the invention monitor the user's navigation of pages and other input in the interactive service. The invention increases usability and the user's feeling that the GUI is aware of his selections in the interactive service. To present betting information in an attractive format and maximize the information available to the bettor, the user interface to the betting service is integrated with an enhanced news service that has a scrolling news frame that is aware of the user's navigation in betting pages. In real-time, the bettor may receive automatic news information concerning the betting opportunities in which he displays an interest. Since most bettors prefer to have as much information as possible when betting, they prefer to wait until the last possible moment to bet.

The invention provides the bettor with betting window information and the latest information concerning the prospective wagers. Moreover, the user interface is designed to provide such information in a manner that both attracts the attention of the bettor and provides the information in a useful, easy to follow and navigate format in Wireless Application Protocol (WAP) equipped mobile stations. Scrolling news items are retrieved from a database based on selections that the user makes in the interactive service. The news items are shown to a user one by one. User behavior in the web site of the interactive service is traced all the time and every move is registered into a log file or database. Every time a subject, sport or team of interest changes, a new set of scrolling news will be fetched and displayed.

The betting services themselves can also be personalized in any number of ways to provide an advanced betting system. For example, the system can collect information of each bettor's preferred betting subjects or sports teams and provide personalized betting services according to the preferences indicated by the collected betting information.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to preferred embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The preferred embodiments of the disclosed innovations involves the simultaneous reception and display of an interactive service and display of dynamic news content on a mobile terminal. The dynamic news content is like that of a wireless terminal, e.g., a mobile phone, a media phone, or an electronic book. The embodiments of the disclosed method and system will be described using interactive betting as an example of interactive content supplied to an end viewer.

However, it should be noted that interactive betting is just one of many services that can be provided with the disclosed embodiments.

Figure 1:
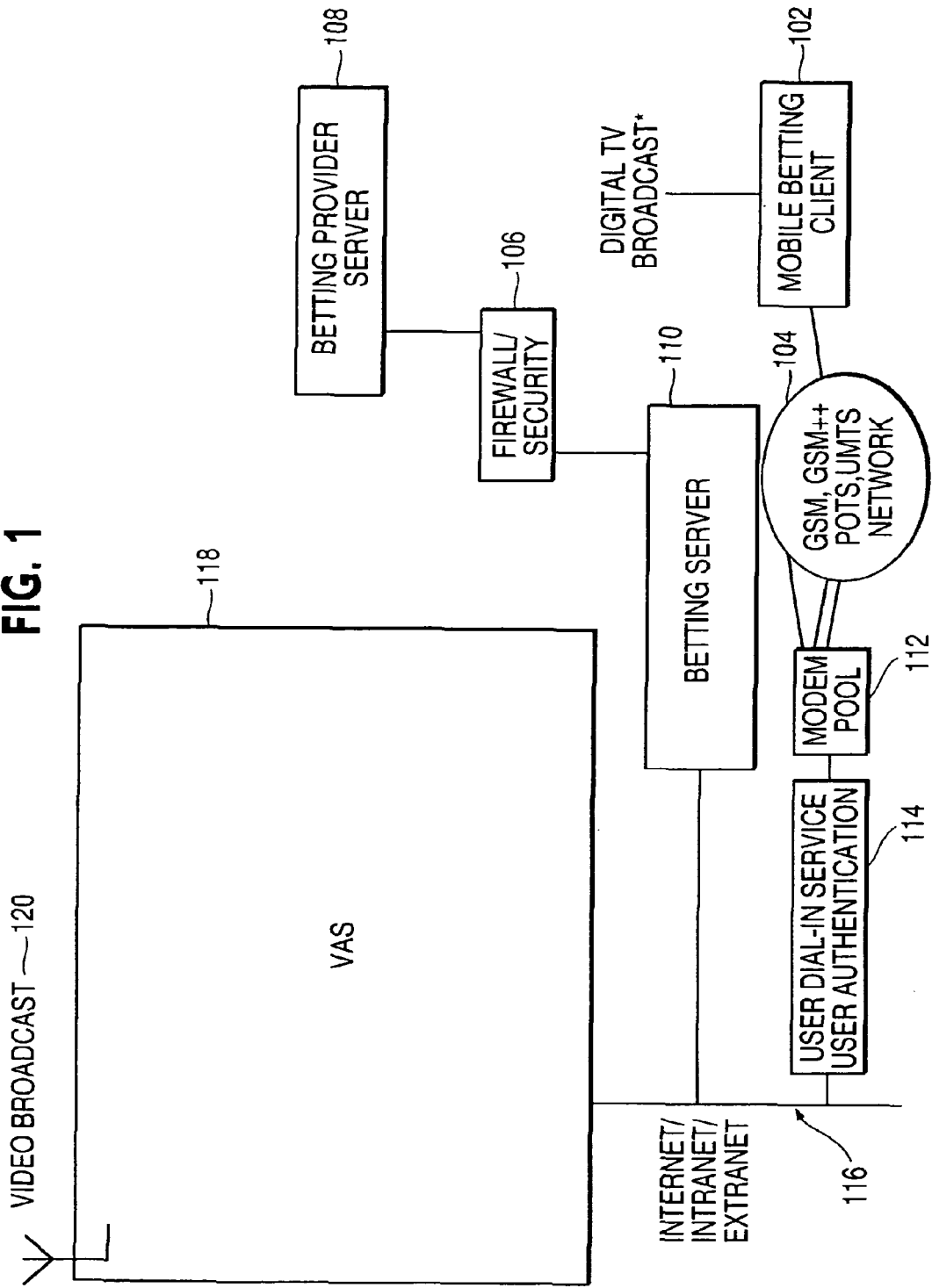
FIG. 1 depicts a block diagram of the creation, reception, and response to interactive services.

In the various disclosed embodiments, an interactive application, betting, for example, is facilitated. FIG. 1 depicts a block diagram of the creation, reception, and response to interactive services in the presently preferred embodiment. Digital news content 120 is received, compressed, and converted for streaming onto the Internet 118 by a news database. Betting information is also created or obtained and then streamed onto the Internet 108 and 110. A mobile betting client 102 can display the news content 120 and the betting information simultaneously and a viewer can interactively select betting via the mobile betting client 102. Finally, the mobile betting client 102 transmits information to the host facility 108 by connecting to a network 116 linked with the host facility 108, for example, the Internet.

Figure 2:
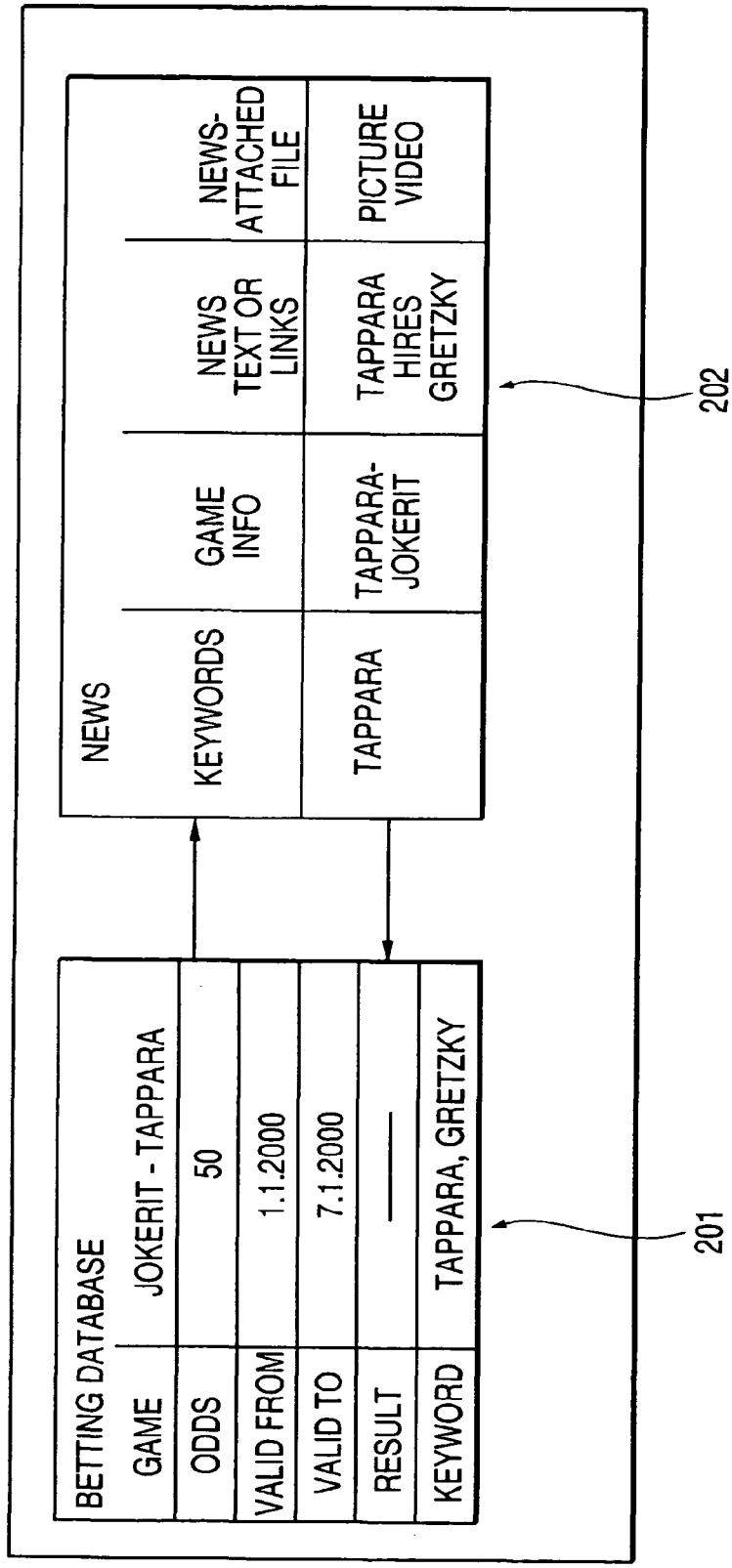
FIG. 2 depicts an example of the structure of a server containing databases for the betting data and news content.

Alternatively, a single host facility 108 can integrate betting data and news content to be supplied to the mobile betting client in an integrated signal. The mobile betting client 102 receives the integrated signal and separates the integrated signal into betting data and the supplied dynamic news content. FIG. 2 shows an example of the structure of a server containing databases for the betting data 201 and news content 202 and which shows in part key elements, e.g., a keyword list, enabling the functionality of the invention described below. Every request from a mobile betting client is handled in the server and navigation parameters are inserted into database tables. Business objects handle requests from mobile betting clients and, if the key subject of interest is changed, a more appropriate set of news will be retrieved from the database for a user of the interactive betting service.

Digital broadcast technology allows for services that can present many-to-one, many-to-many, and one-to-one communication. DVB has defined delivery media for satellite services (DVB-S, direct-to-home viewing, cable (DVB-C) run in several countries, and terrestrial, or "over the air", (DVB-T) planned for 17 countries. Use of return channels enables digital receivers to provide a variety of services including Internet, television, and web content. Processing of the digital signal can be accomplished on a desktop or laptop computer.

Mobile betting client 102 is able to act as an Internet browser and preferably has a very thin applet for socket connection with the server as described in more detail below. Along with web browsing functions, the mobile betting client is equipped with a display and secure connection capabilities. The mobile betting client 102 preferably has PIP functionality. This functionality allows the viewer to simultaneously view the betting service and the news service in two separate windows.

Figure 4:
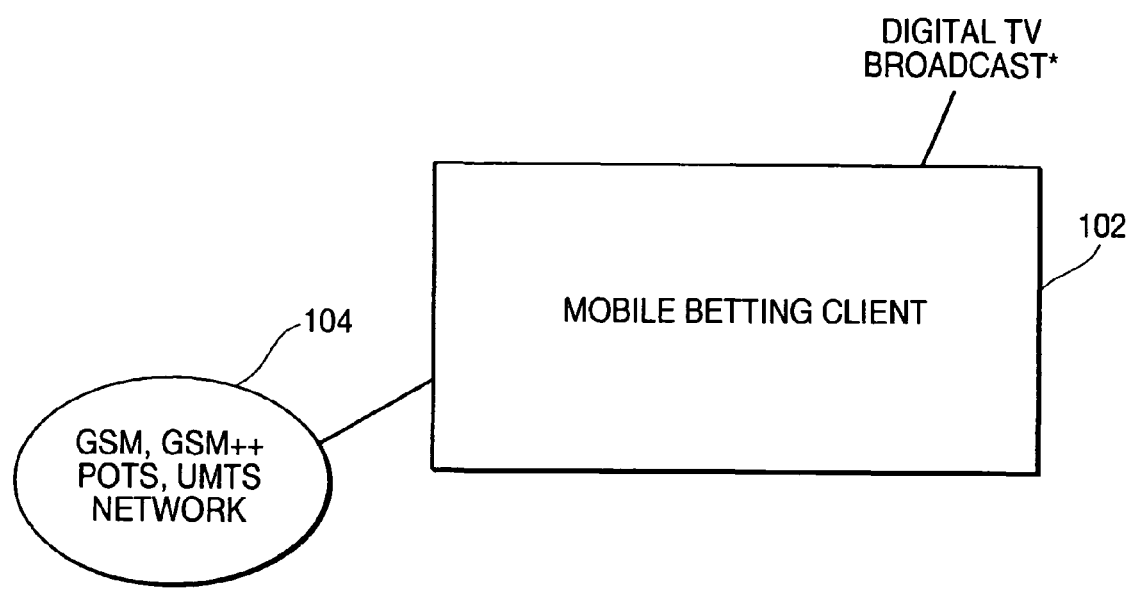
FIG. 4 depicts a block diagram of the viewer's connectivity and interaction with the provided interactive services.

FIG. 4 depicts a block diagram of the connectivity of mobile betting client 102 and interaction with the provided interactive services. In the preferred embodiments, the mobile betting client 102 receives an integrated digital broadcast signal (DVB-T). Reception of the signal can be accomplished through various means. In the presently preferred embodiment, the mobile betting client receives the signal over a GSM, GSM++, POTS, UMTS, or other type of connection 104. The mobile connection 104 is itself connected to a network such as an extranet, intranet, or the Internet 116. Mobile connection to the network 116 takes place in a conventional manner over Hypertext Transfer Protocol (HTTP) using a modem pool 112 with user dial-in and authentication services 114.

Figure 7:
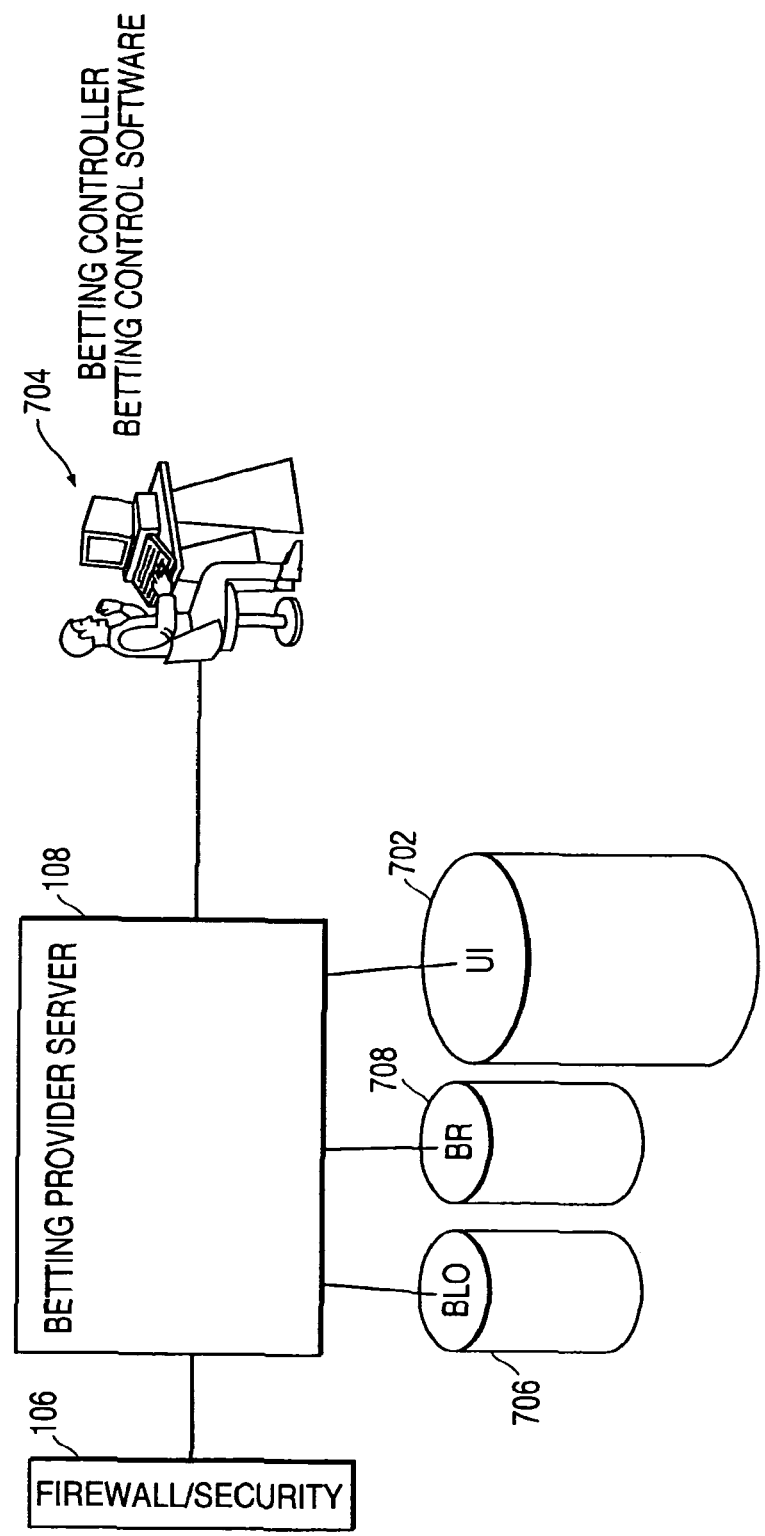
FIG. 7 depicts a block diagram of a first sample embodiment of the betting provider architecture.

FIG. 7 depicts a block diagram of a betting provider architecture. In this preferred embodiment, the betting provider information is protected from network snooping by a security device such as a firewall 106. At least one betting provider server 108 resides behind the firewall. Software running on the server tracks viewers (bettors) in various competitions.

One task of the server 108 is to authenticate viewers. In the presently preferred embodiment, a user information (UI) database 702 is maintained. The UI database 702 stores user names and associated passwords, user account information, user preferences, and other user specific information. In addition to tracking viewers, the server 108 receives and accepts bets that have been requested by the viewer to a betting server 110 running on the network side of the firewall 106 and connected to a network such as an extranet, intranet, or the Internet 116. This betting server 110 acts as an interface between users of the interactive services and the actual betting provider.

The betting provider server 108 receives betting content (questions to the user) and the odds of the particular bets from a betting controller 704. The betting controller 704 is responsible for creating betting content, controlling the betting event, i.e., opening and closing of betting, etc. Betting control software is used to enter and calculate betting content and odds and send them to the betting provider server 108. In the presently preferred embodiment, the betting provider server 108 stores the betting content and odds in a database (BCO) 706. The betting controller 704, via betting control software tracks, the results of the betting question and reports the results to the betting provider server 108.

The results of the bets are stored in a database (BR) 708. Once the results of a particular question are known and stored by the betting provider server 108, software on the server calculates payments to the bettors on the particular question. In the presently preferred embodiment, electronic accounts stored in the UI database 702 are used for tracking betting wins and losses. The results of the event and sub-events (betting questions) are reported to the betting server 110. The mobile betting client 102 can then receive the results from the betting server 110.

Figure 3:
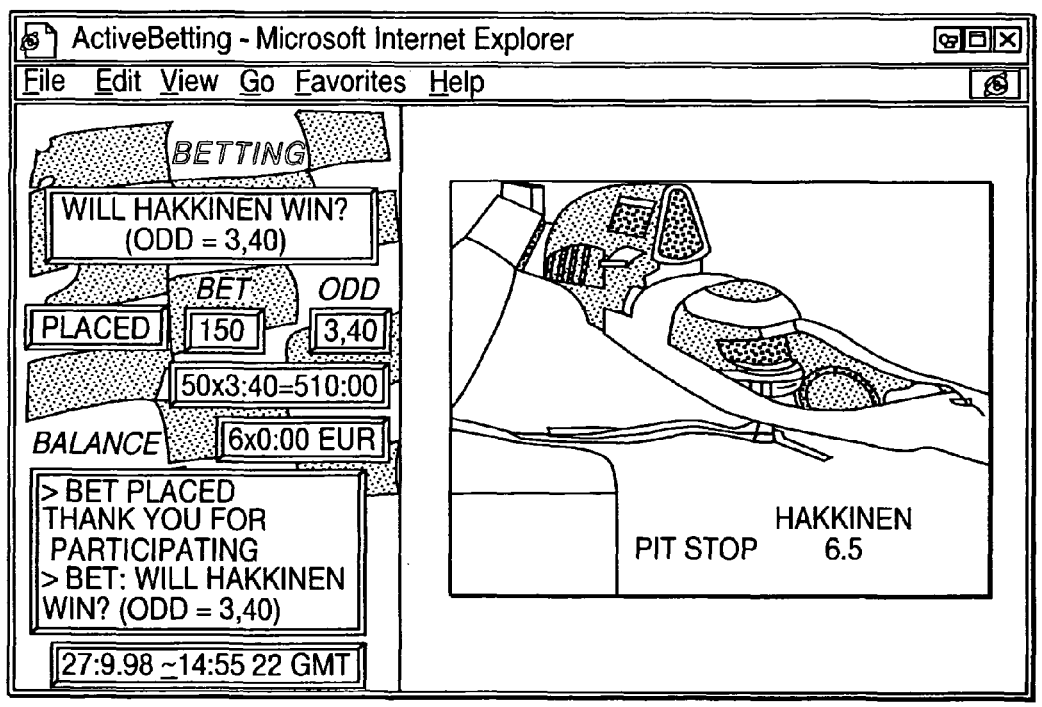
FIG. 3 depicts an integrated display with a live video feed and interactive content.
Figure 5:
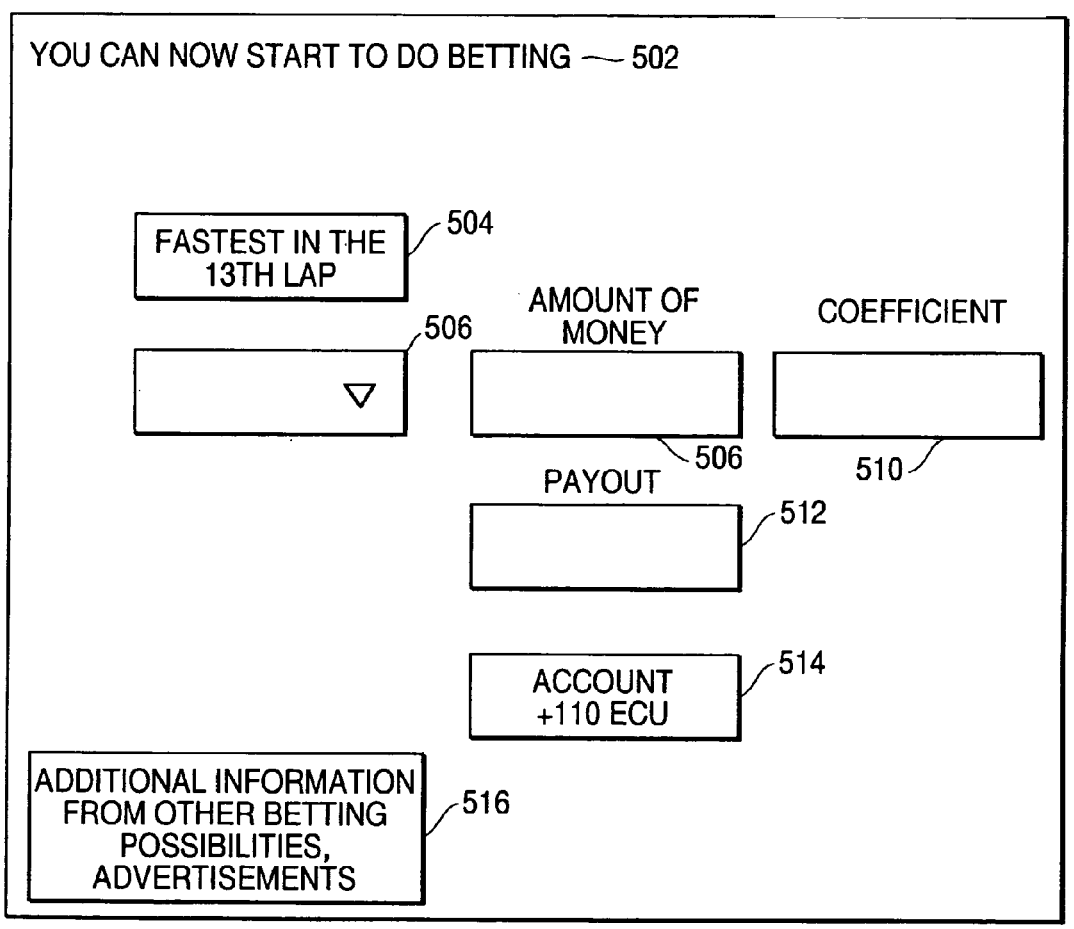
FIG. 5 is a diagram depicting a possible interactive display.

FIG. 5 is a diagram depicting a possible interactive display for betting services. Directions at the top of the display 502 inform the viewer of the status or title of the interactive activity, in this case, betting. For an application such as betting, a dialog-type box 504 is used to inform the viewer of the current question on which bets can be placed. In the context of an auto race, a question such as "Who will turn the fastest 13th lap" may be presented. A pull-down menu or radio button dialog box 506 may be presented depending on the type of question. In the above example, all of the drivers remaining in the race may be presented in a pull-down menu. Dialog boxes specific to wagering: stakes 508; odds 510; and payout 512, may also be presented. A statement of account 514 with a betting services provider may also be presented. The account is dynamic throughout the competition, registering winnings and debits as each occurs. A response dialog 516 informing the user of bets being received and the current allowable wagers may also be provided. Such a response window is also dynamically updated as available bets are made or changed. In addition to the displays listed above, dialog boxes presenting last minute betting advice or information can also be displayed. Such advice can include, for example, up to the minute status of race participants not currently being shown on the broadcast or the injury status of key players at an event. FIG. 3 depicts an integrated display with a live video feed and interactive content.

Figure 10:
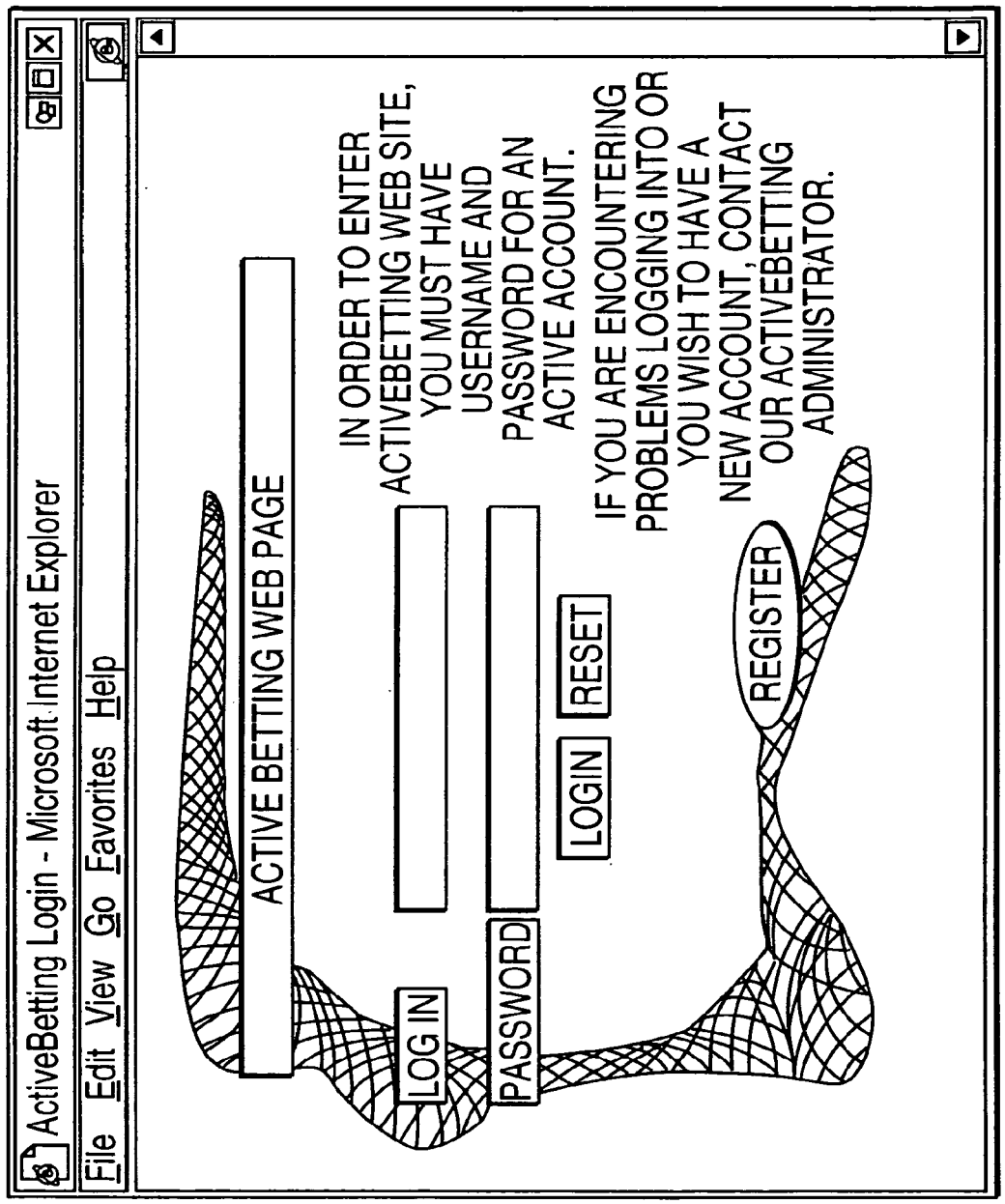
FIG. 10 depicts a betting login page which includes Login and Password fields for logging on to the interactive service.

FIG. 10 depicts a betting login page which includes Login and Password fields for logging on to the interactive service. In order to participate in the service, the user will need to register with the betting provider server 108. New users will need to register. Registration information includes information about the device the user is connecting with, the bandwidth of the connection, and the style sheet (or skin) the user prefers. New users generally are kept from participating in the service until an active betting supervisor or administrator enables the user logon.

Figure 11:
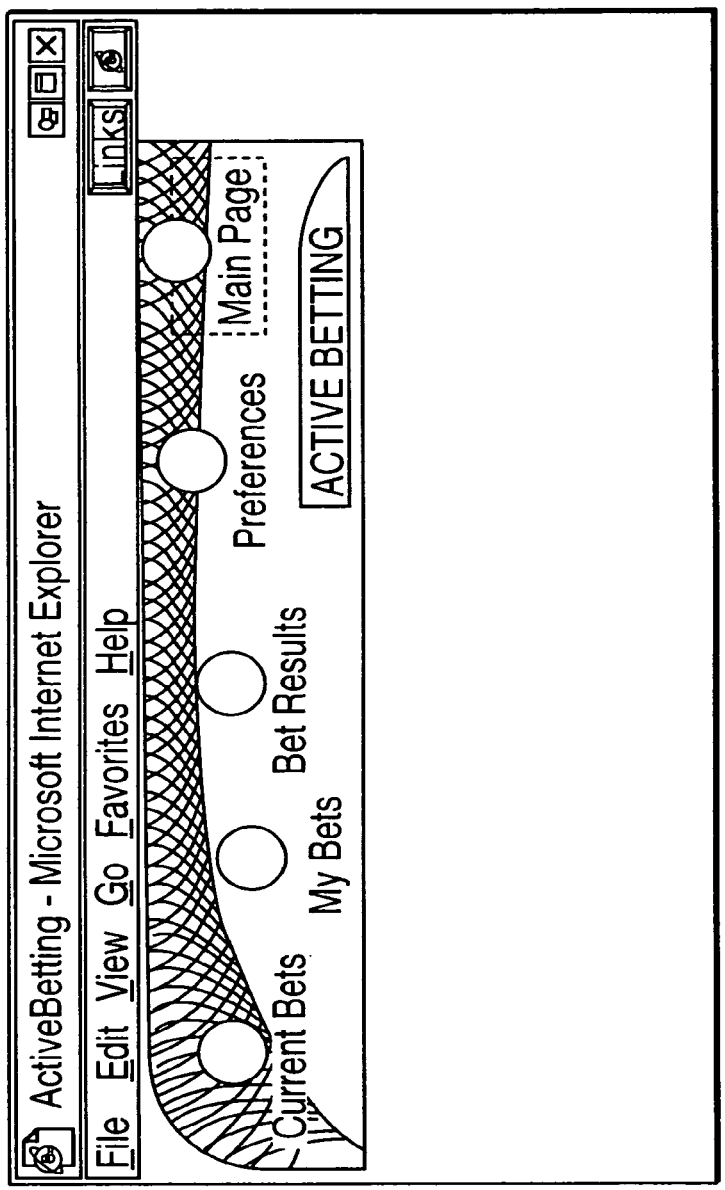
FIG. 11 depicts a main betting page supplied by the betting server to the user at logon.

Logging on allows users of the service to make bets and watch both live and on-demand streaming broadcasts. FIG. 11 depicts a main betting page supplied by the betting server 110 to the user at logon. Information such as the current time, last use, and account balance information is displayed Information such as the number of other users currently participating can also be displayed.

Figure 8:
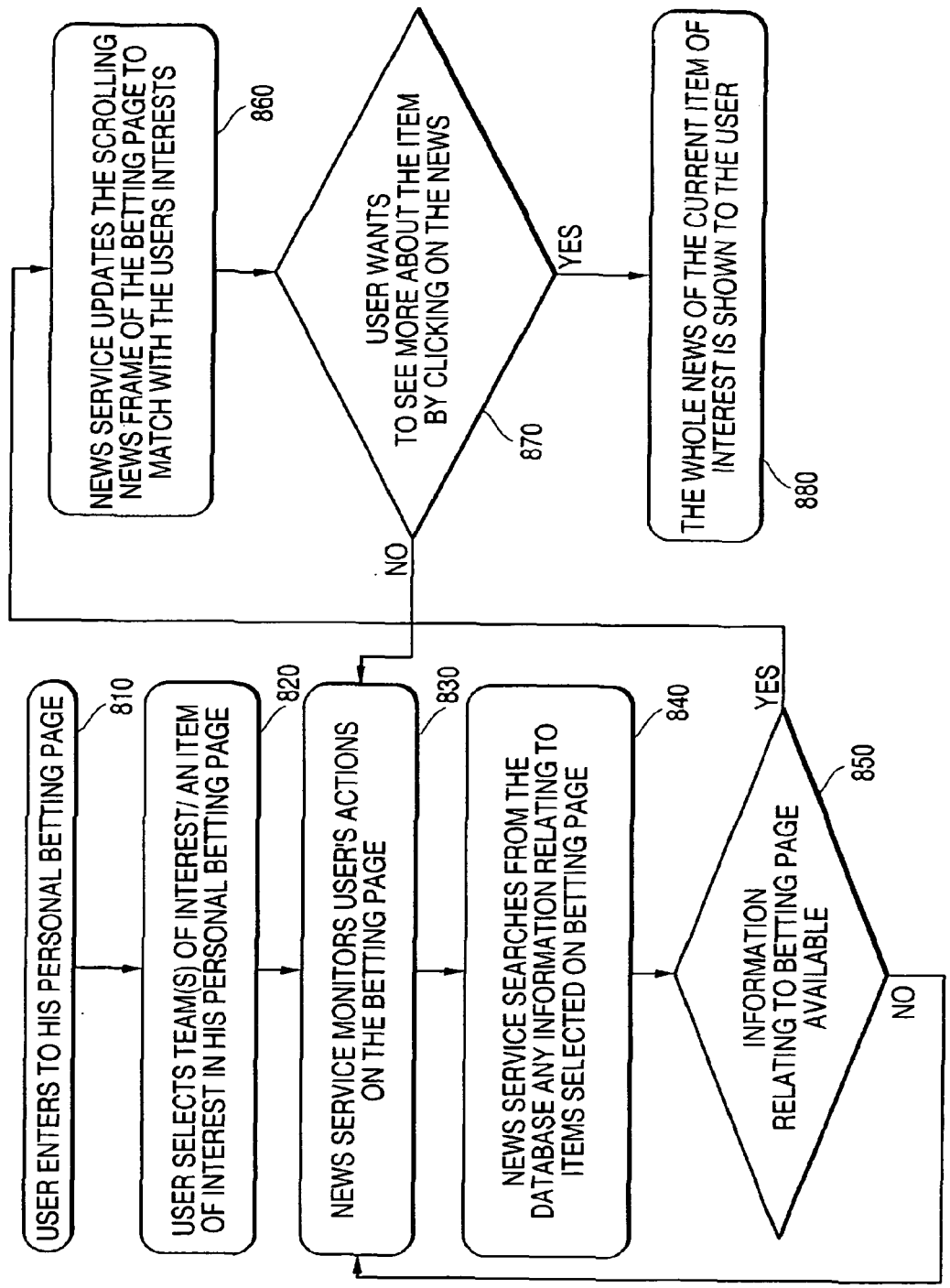
FIG. 8 is a flowchart illustrating an example method of providing an automatic news service in conjunction with an interactive betting service.

Users can navigate from the main betting page to other pages by navigating with the arrow or cursor control keys. FIG. 8 shows an example method of providing an automatic news service in conjunction with the user's navigation through betting pages in the interactive betting service. At step 810, the user enters his personal betting page. He can scroll the list of different topics and select the ones that are interesting (Step 820). The news service server monitors the user's action on the betting pages (Step 830). The server automatically checks in the database for any news information relating to items selected on betting page(s) (Step 840). If such a relating news information is not found or is not available (Step 850), the news service server continues to monitor the user's actions at Step 830. If such a relating news information is found and is available, the news service updates the scrolling news frame or window of the betting page (Step 860). If the user wishes to see more about the item of interest, he can click on the news item in the news frame (Step 870). The entire new story is then shown to the user (Step 880). If the user does not wish to see more about the item of interest, the news service server continues to monitor the user's actions at Step 830.

Figure 9:
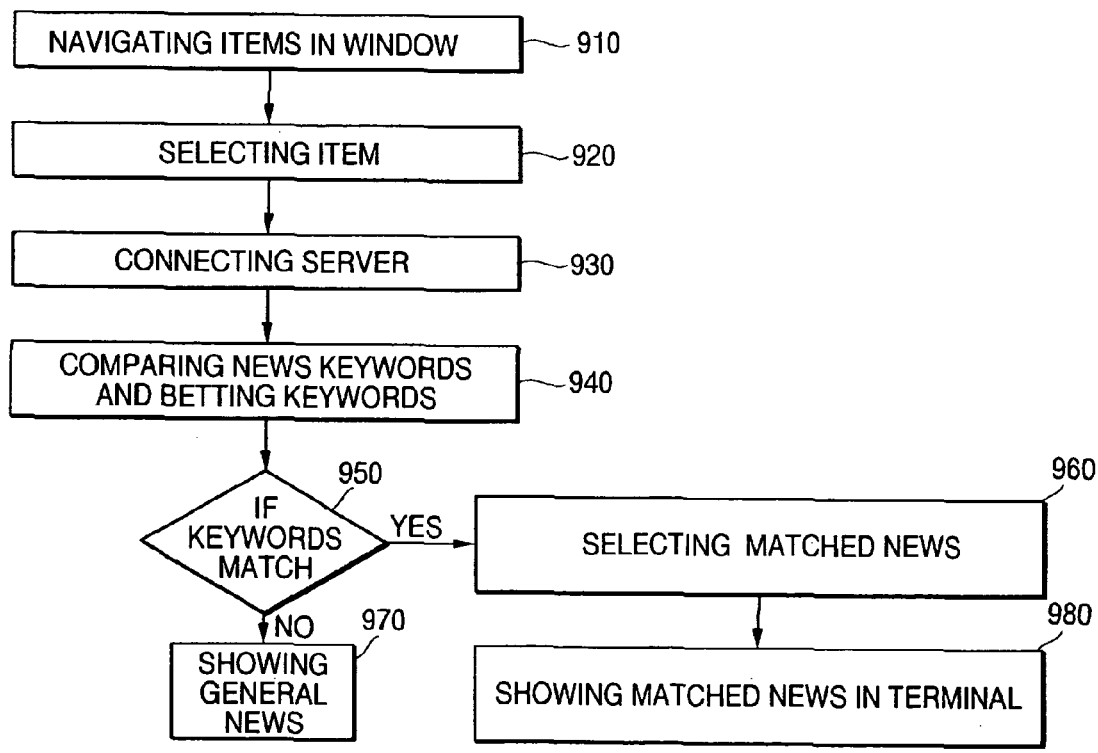
FIG. 9 is a flowchart illustrating the process of selecting and showing relevant news items to the bettor in an interactive betting service.

Of course, the method of operating the news service in conjunction with the betting service shown in FIG. 8 is only exemplary. FIG. 9 is a flowchart illustrating another process of selecting and showing relevant news items to the bettor in an interactive betting service. Similarly, the process depends upon the user navigating through items in the betting service window (Step 910) and selecting an item of interest (Step 920). But at this point, the mobile betting client 102 must connect to the server (Step 930). Preferably, this is done by sending a client to the server. This request can be handled with Java Servlets (or other server side technology available from companies such as Microsoft Corp., of Redmond, Wash.) that will call business objects. Preferably, a thin applet in mobile betting client 102 uses LiveConnect technology from Netscape Corporation of Mountain View, Calif. and Document Object Model (DOM) tree manipulation to update the Hypertext Mark-Up Language (HTML) source in the news frame. The business objects will interpret the user selection and insert the information into a log database or into ASCII or XML log files. After the user's selection has been registered, servlets form a response to the clients request using business objects. This response is delivered over HTTP.

The server then compares the user's keywords in the betting service to keywords in the news database (Step 940). If the keywords do not match, then a default of general news items is shown (Step 970). If the keywords do match (Step 1650), the matching news item is selected (Step 960) and automatically shown to the user in the display of mobile betting client 102 (Step 960). The business objects in the server update the news item in the news service window by "pushing" through a raw socket protocol rather than being "pulled" by hypertext transfer protocol.

Figures 12, 13:
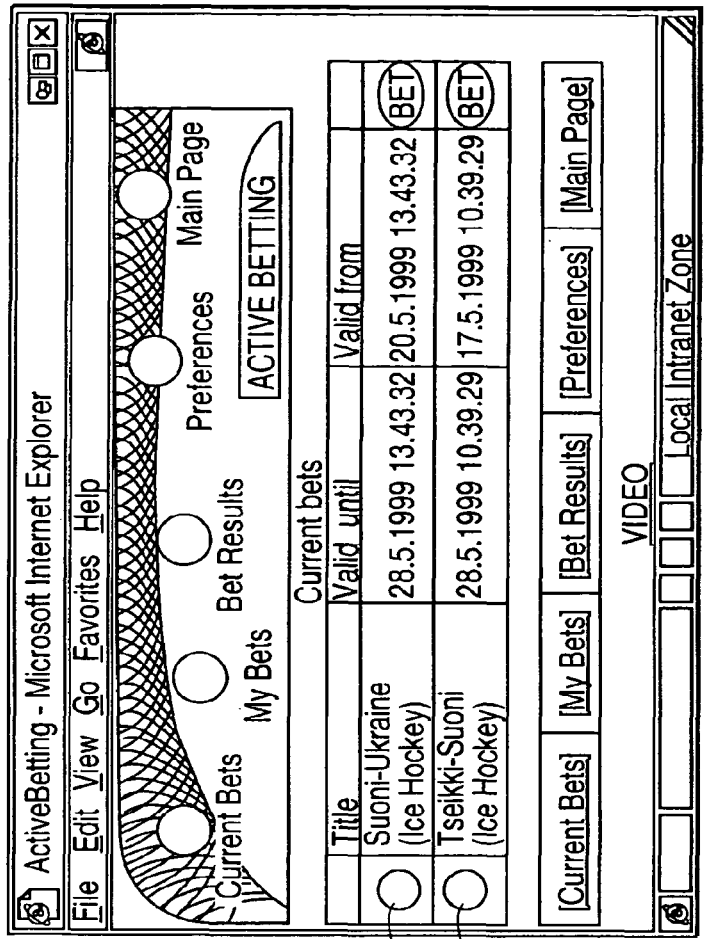
FIG. 12 depicts a window showing the status of currently available betting opportunities.
FIG. 13 depicts a table representing the user selection of colors and when the different colors can be shown.

FIG. 12 depicts a page showing the status of currently available betting opportunities. The betting window, that is the times during which placed bets will be valid is also displayed. The page functionality is shown as visual or graphical illustrations. The page can contain and present betting information in many different forms, for example, warning lights. The page depicted in FIG. 12 has blinking lights in the form of traffic lights 1202. The traffic lights are designed to provide advanced notification to the user of situations in the betting window. For example, one situation would be the amount of time left in the betting window. For another example, a change in the betting information which could affect the choice of bets placed. In the presently preferred embodiment, the traffic lights use color to indicate the importance or immediacy of particular information: e.g., red, orange and green.

FIG. 13 depicts a table representing the user selection of colors and when the different colors can be shown. The color preference choice can be made at registration. In the presently preferred embodiment, the orange traffic light is configured to appear a day or two prior to the close of the betting window. The red light is configured to appear when only a few minutes of betting are available. In the presently preferred embodiment, the user cannot change the appearance of the utmost important color. The utmost important color is set by the rules of the betting administrator, usually red.

In addition to traffic signals, the window can have flashing or blinking colors to impart information to the user. Again, the flashing or blinking of text can be made at registration. The user interface database 702 in the betting provider server 108 contains the skin preference information i.e., titles of the pages, background information selections, font selection, color selection etc.

Figure 6:
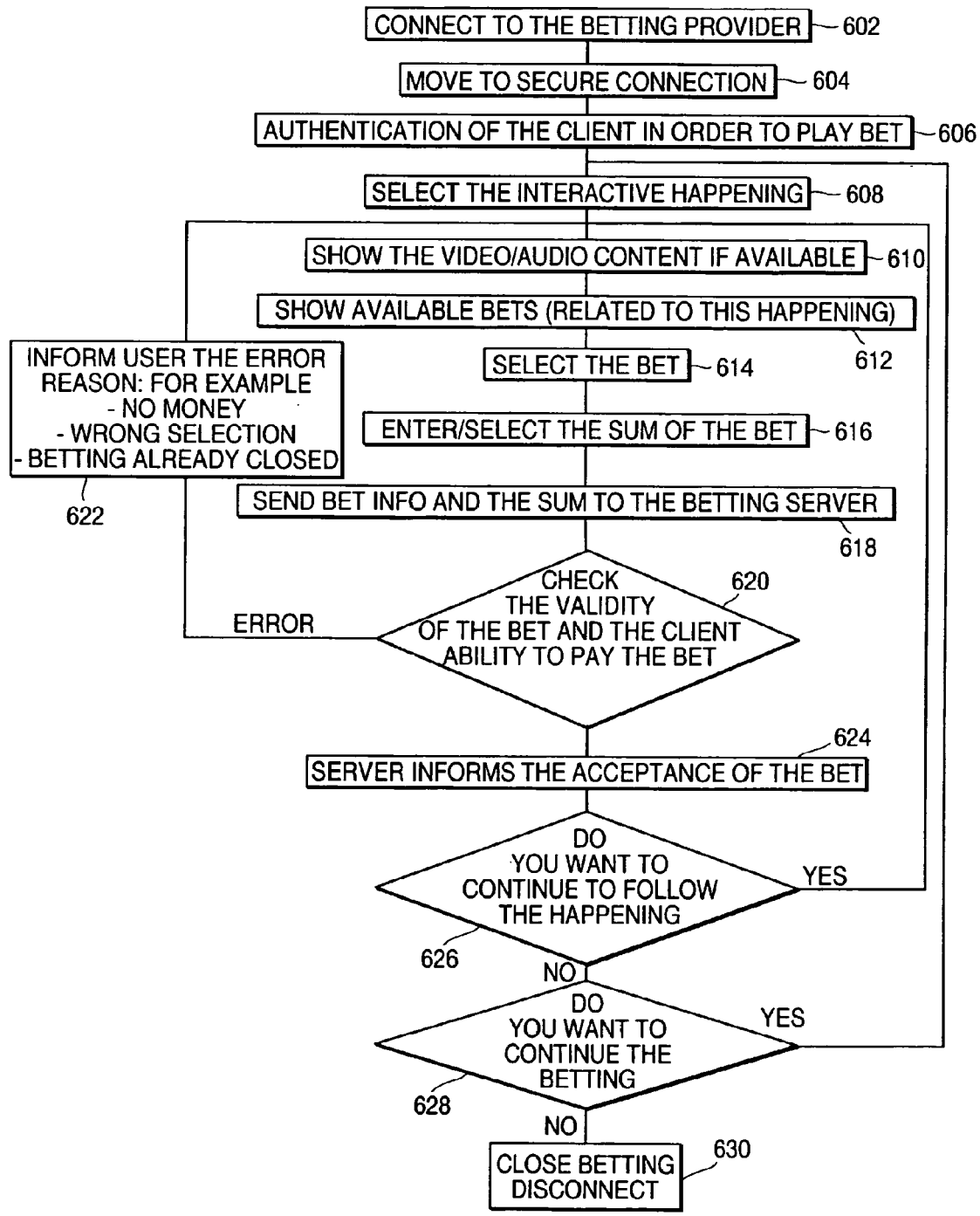
FIG. 6 depict a flowchart of the interactive betting process.
Figure 14:
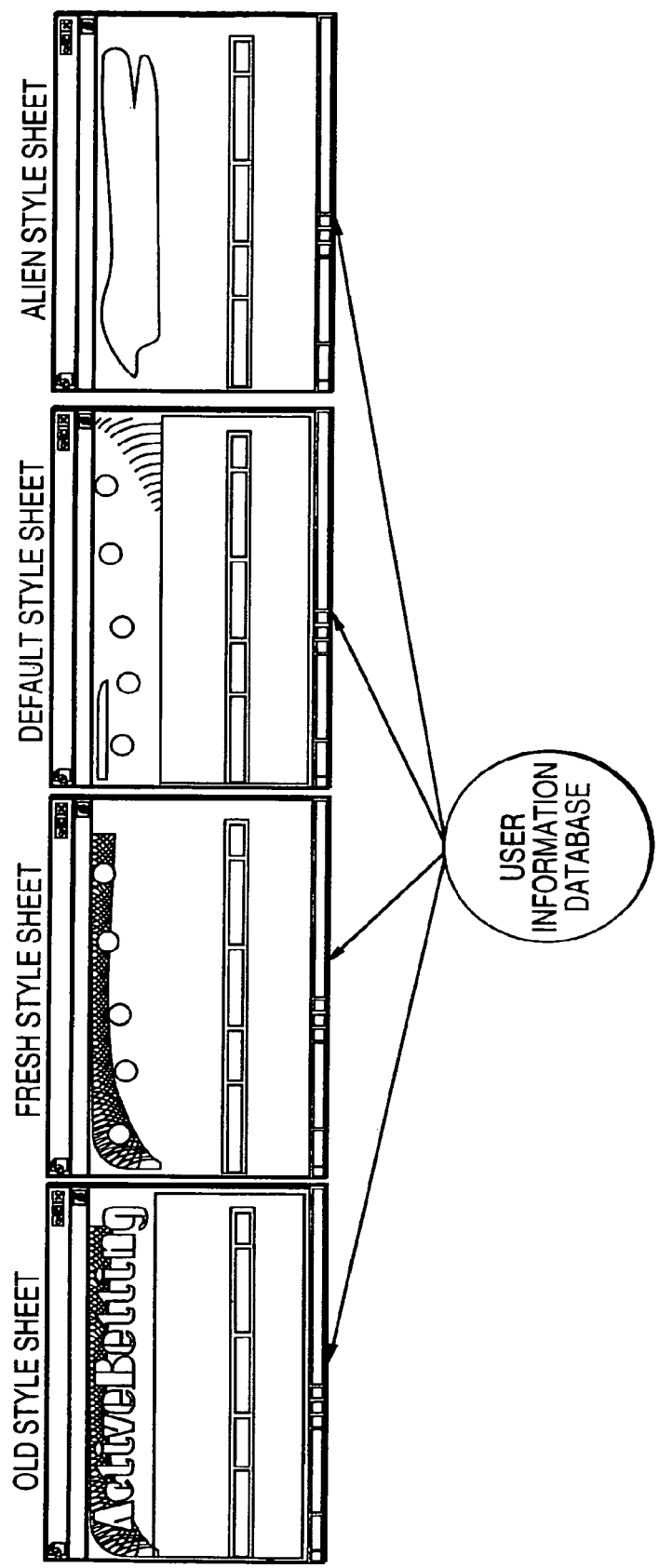
FIG. 14 depicts skins which can be configured according to user preference.

FIG. 14 depicts skins which can be configured according to user preference. In the presently preferred embodiment, the users personal information page allows changes in skin preferences. For example, if player is a NHL Dallas Stars fanatic, the user can change color of pages, icons, and push buttons, to green and gold tones FIG. 6 depicts a flowchart of the interactive betting process. First, a mobile betting client wishing to interactively bet connects to the betting provider (Step 602). Once connected, a secure network connection, using, for example, encryption or secure sockets, is established (Step 604). Once a secure connection is established, an authentication process occurs, comparing user name and password entered by the client to entries in a database of user information (Step 606). Once authenticated, the client can select the type of competition to bet on, for example, auto racing, hockey, or football. (Step 608). If live video and audio is available, the competition can be shown or played (Step 610) if the resources of the client permit. The interactive betting opportunities currently available for the chosen competition are then displayed to the client (Step 612). The betting opportunities are dynamic and will be continuously updated. The client informs the betting provider of its desire to bet (Step 614) and the stakes (Step 616). The stakes can be variable amounts or limited to selections presented in a choice menu. The betting selection and the stakes are sent to the betting provider across the secure connection (Step 618). The betting provider verifies the entries made by the client (Step 620). Further checks, including client payment history and credit reports can be included in this verification step (Step 620). If any of the entries is invalid, a valid entry is requested (Step 622). Entries can be invalid for several reasons, for example, incorrect selection, closing of the requested betting selection prior to the bet being received, or the client's inability to cover the stakes.

If the entries are valid, the betting provider informs the client of that the particular wager has been accepted (Step 624). Different bets open and close during the course of the competition. Once the bet has been made and accepted, the client may continue to view the competition, personally monitoring the outcome of its wager and making other bets on the same competition (Step 626). The client may also choose a different competition to view and possibly bet on (Step 628). If the client does not wish to view or bet on any other competitions, the connection between the client and the betting provider is closed (Step 630). At some point after the close of a particular wager, the participants are informed of the result and appropriate adjustments to betting accounts are made. If the client is still connected to the betting provider when the results are known, the client can be informed of the results. Otherwise, the client can be informed of the status of any outstanding wagers the next time a connection to the betting provider is established.

As will be recognized by those skilled in the art, the innovative concepts described in the present application can be modified and varied over a tremendous range of applications, and accordingly the scope of patented subject matter is not limited by any of the specific exemplary teachings given.

For example, the indicators for changes in betting situation in the presently preferred embodiments are traffic signals. However, other indicators can be used to highlight the importance or display information to the user. For example, the interface depicting the time left in a betting window can be textual, graphic, animation, audio, or video media.

For another example, the mobile betting client monitor has been described. The monitor can be any type of display. For example, a television or computer monitor, including flat panel type displays.

The mobile client itself can be any type of unit capable of receiving and displaying signals. For instance, the mobile client can be an HDTV with a PIP module and web browser capability. On the opposite end of the mobility and size spectrum, the mobile betting client can be a hand-held cellular phone with a small display.

Depending on the capabilities of the mobile client, intermediate protocols and network connections may not be required to achieve connection to the streaming data and interactive servers.

The databases containing betting and user information can be designed with any number of differing architectures, for example, relational, hierarchical, or object oriented.

While interactive sports betting has been described, other interactive events can be integrated and broadcast. Such events can include, for example, video games, shopping, and educational activities.

The preferred context of the disclosed embodiments contemplates digital delivery of broadcasts. However, depending on the hardware setup, analog signals may be used for delivery of the event broadcast and the interactive display.

The preferred context of the disclosed embodiments contemplates delivery of events and betting information. However, a software stand-alone version, for example, an interactive CD-ROM video game, can be created having the functionality of the network and servers and terminals. Random generation can simulate live events. The video or interactive content of the game can remain the same with the random generation providing the variation needed for multiple plays.

In another context, software, for example, an interactive CD-ROM video game, can be created which depends on interactivity with the network and servers of a betting provider to generate the random events and betting opportunities in a simulated game. Such a game can be played interactively with other participants at remote locations all receiving the same randomly generated events and betting opportunities.

What is claimed is:

1. A method for providing targeted content to a user, the method comprising the steps of:
   providing content to the user across a wireless connection, wherein the content includes:
   an interactive service;
   and a news service operating in conjunction with the interactive service;
   monitoring content items viewed by the user in the interactive service;
   identifying at least one keyword associated with the content items viewed by the user and that is stored in a content server;
   searching a database associated with the content for information relevant to the keyword; and
   pushing the information to the user via the news service.

2. The method of claim 1 wherein the step of pushing the information comprises:
   updating a scrolling news frame portion of the news service with the information.

3. The method of claim 1 further comprising the steps of:
   using the news service to monitor the user's interaction with the information; and
   providing the user with detailed news information upon the user's selection of the information.

4. The method of claim 1, wherein the step of providing content of the interactive service further includes the step of providing at least one of odds, stakes, current bets made by betters, a number of currently participating bettors, and betting windows.

5. The method of claim 1 further comprising the steps of:
   integrating interactive service data and news service data into one signal transmitted over the wireless connection; and
   separating, at least in part, the integrated signal into the interactive service data and the news service data.

6. The method of claim 1, wherein the keyword is derived from the navigation selections of the user while interacting with the interactive service.

7. An apparatus comprising:
   at least one processor;
   and at least one memory storing computer program code, and storing at least one keyword;
   wherein the memory and the computer program code are configured to, with the at least one processor, cause the apparatus to perform at least the following:
   provide content to a user over a wireless connection, wherein the content includes:
   an interactive service;
   and a news service operating in conjunction with the interactive service;
   monitor content items viewed by the user in the interactive service;

identify at least one of the stored keywords associated with the content viewed by the user;

search a database associated with the content for information relevant to the keyword;

push the information to the user via the news service.

8. The apparatus of claim 7, wherein the apparatus is further caused to:

initiate transmission of data, as part of the interactive service, in real-time from the interactive service to be displayed to the user;

initiate transmission of at least one of the selections and other input the user makes via the interactive service to the news service; and register the selections into at least one of log file and a database.

9. The apparatus of claim 8, wherein the content items provided in the interactive service includes at least one of odds, stakes, current bets made by betters, a number of currently participating bettors, and betting windows.

10. The apparatus of claim 9, wherein the apparatus is further caused to:

integrate the interactive service data and the news service data into one signal; and separate the integrated signal into the interactive service data and the news service data.

* * * * *